United States Patent [19]

Oh

[11] 4,424,706

[45] Jan. 10, 1984

[54] ENGINE WITH KNOCK SENSING USING PRODUCT COMPONENT OF KNOCK VIBRATION SIGNAL

[75] Inventor: Hilario L. Oh, Rochester, Mich.

[73] Assignee: General Motors Corporation, Detroit, Mich.

[21] Appl. No.: 379,643

[22] Filed: May 19, 1982

[51] Int. Cl.³ .......................................... G01L 23/22
[52] U.S. Cl. ..................................................... 73/35
[58] Field of Search ..................... 73/35; 123/425, 435

[56] References Cited

U.S. PATENT DOCUMENTS 4,290,301  9/1981  Yamaguchi et al. ..................... 73/35
4,345,558  8/1982  Yamaguchi et al. ................ 123/425
4,364,260  12/1982  Chen et al. .............................. 73/35

Primary Examiner—James J. Gill
Attorney, Agent, or Firm—Robert M. Sigler

[57] ABSTRACT

An engine subject to knock induced vibrations of at least two characteristic knock frequencies and noise vibrations processes the output of a vibration sensor in, for example, a square law device to generate a product component only when vibrations occur simultaneously at both characteristic knock frequencies. The amplitude of the product component is proportional to the product of the amplitudes of the two characteristic knock frequency components for an improved signal to noise ratio; and the frequency of the product component is equal to the difference of the characteristic knock frequencies. A band pass filter passes the product component to further signal processing apparatus including a comparator which generates a knock signal when the amplitude exceeds a reference. The knock signal may be used in a closed loop system to control knock in the engine.

4 Claims, 4 Drawing Figures

ENGINE WITH KNOCK SENSING USING PRODUCT COMPONENT OF KNOCK VIBRATION SIGNAL

BACKGROUND OF THE INVENTION

This invention relates to spark ignited internal combustion engines including apparatus for sensing knock and capable of controlling spark timing or some other engine operating parameter to limit such knock to acceptable levels. It particularly relates to such engines in which knock induces engine vibrations at a plurality of characteristic knock frequencies corresponding to the acoustic cavity resonance modes of the knocking combustion chamber and in which noise vibrations from causes other than knock also occur at a plurality of frequencies.

Knock induced vibrations in such engines are generally sensed as bursts of carrier waves of the characteristic frequencies combined with relative amplitudes determined, for a particular engine combustion chamber, by the acoustic cavity resonance modes and the engine vibration transfer characteristics from the combustion chamber to the sensor location. The envelopes of these vibration waves generally form pulses having time constants corresponding to a much lower frequency. The primary difficulty in reliable knock detection has been in identifying knock induced vibrations in the presence of noise vibrations, which comprise broad band background noise but which may also occur as noise vibration bursts at a frequency which may be the same as one of the characteristic knock frequencies.

Most practical knock detection systems rely at least partly on amplitude discrimination between the peak amplitude of individual knock vibrations in a burst or of the overall burst envelope and an average background noise level. Such systems usually include apparatus to sample the signal and form some sort of average noise level with which the signal itself can be compared. In order to increase the signal to noise ratio, some form of frequency discrimination is usually also employed, with the sensor signal passed through a band pass filter centered on one of the characteristic knock frequencies. It has been recognized that the existence of a plurality of characteristic knock frequencies corresponding to the acoustic cavity resonance modes of the knocking cylinder provides the opportunity for increasing the reliability of knock detection in an engine subject to substantial noise vibrations at one of the characteristic knock frequencies if knock is identified only with the simultaneous occurrence of vibrations at two (or more) of the characteristic knock frequencies. To accomplish this, filtered vibration sensor means may supply vibrations at the characteristic knock frequencies, when they occur, to a pair of signal processing channels, each of which processes the signal at one of the characteristic knock frequencies and signals the presence of vibration amplitude above a reference level. Coincidence sensing means generates a knock signal when the amplitudes on each channel exceed their references simultaneously.

However, even with the system described above, there is a signal to noise ratio problem as the background noise level increases, especially with increasing engine rotational speed. Each channel contains apparatus which compares vibrations at a characteristic knock frequency with some average noise level varying with the average noise vibration level in the engine. As this average noise vibration level increases and approaches the peak levels of the signals to be compared therewith, the reliable detection of knock becomes more difficult due to decreasing signal to noise ratio.

SUMMARY OF THE INVENTION

Therefore it is an object of this invention to provide an apparatus and method for improving the signal to noise ratio in the detection of knock vibrations in the presence of noise vibrations in an internal combustion engine.

It is another object of this invention to provide such an apparatus and method which further increases the reliability of the detection of knock vibrations by responding to knock vibrations at a plurality of characteristic knock frequencies.

These and other objects are obtained in an apparatus and method for detecting knock induced vibrations in an internal combustion engine in which the signal from a knock sensor is supplied through a high pass filter to a signal processor which generates a product component from input components at two characteristic knock frequencies, the product component having an amplitude proportional to the amplitudes of the input components and a frequency equal to the difference of the frequencies of the input components. The product component is selected from other generated components in a band pass filter and provided to conventional signal processing apparatus for detection of an amplitude greater than a noise derived reference and the signalling of knock when this reference is exceeded. The input high pass filter is designed to suppress components at a frequency equal to one half the difference of the input component frequencies. The signal processor may take the form of a simple square law device such as a diode which generates the required product component. The apparatus will generally not produce an indication of knock unless input signals at both characteristic knock frequencies occur simultaneously; and, in addition, the overall signal to noise ratio is equal to the product of the signal to noise ratios of the input signals at the characteristic knock frequencies and is therefore improved. Furthermore, the advantages of multiple characteristic knock frequency sensing are obtained in apparatus requiring only a single channel of signal processing following the band pass filter for possible cost savings. Further details and advantages of this invention will be apparent from the accompanying drawings and description of the preferred embodiment.

DESCRIPTION OF THE PREFERRED EMBODIMENT

Figure 1:
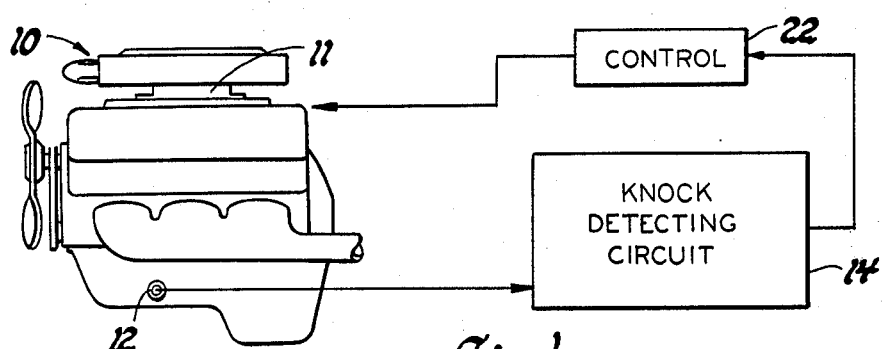
FIG. 1 shows an internal combustion engine with knock detecting apparatus according to this invention.
Figure 3:
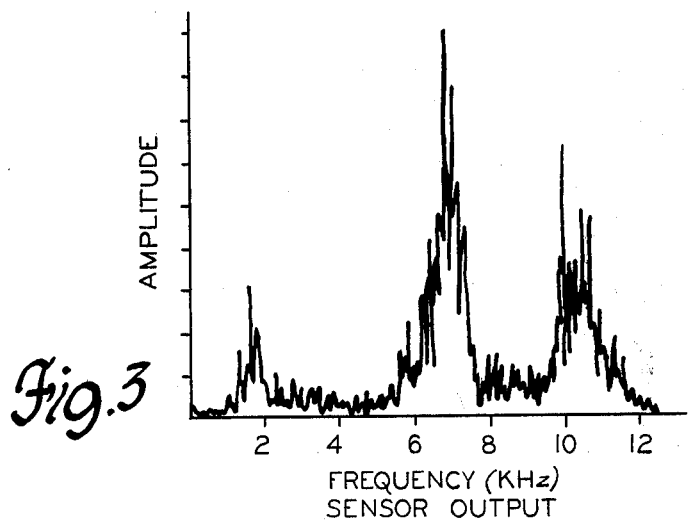
FIG. 3 shows an amplitude versus frequency plot of the output of the knock sensor in the apparatus of FIG. 2.

FIG. 1 shows an internal combustion engine 10 of the type having a plurality of combustion chambers. Air and fuel intake apparatus 11 provides fuel charges to the chambers of engine 10 for ignition via spark plugs, not shown. Under certain engine operating conditions, the flame front in the combustion chamber expanding from the ignition point may compress the remaining unburned fuel charge with sufficient pressure to cause a second ignition point with its own expanding flame front and resulting strong vibrations of the gasses within the chamber. The energy of these vibrations tends to concentrate in a plurality of resonant vibration modes, each with a characteristic frequency, which modes depend upon the shape and size of the combustion chamber cavity at the time of the vibrations. Since the knock event occurs soon after ignition and ignition is generally timed in the vicinity of the top dead center position of piston movement, the size of the cavity, and therefore the acoustic cavity resonance modes and characteristic resonant frequencies are therefore reasonably predictable for a particular engine. The first two acoustic cavity resonance frequencies of a 305 cubic inch V-8 engine manufactured by the assignee of this application and run at a constant speed of 3000 rpm with trace knock are shown in the plot of FIG. 3 as the peaks at approximately 7 and 10.8 kilohertz. Additional higher acoustic cavity resonance frequencies may exist for this engine; but they are not shown in the plot of FIG. 3.

A knock sensor of the type having a response at least to the knock frequencies to be sensed is mounted on a location of engine 10 or a component thereof such as an intake manifold or throttle body, in which the characteristic knock vibrations are transmitted through the body of engine 10 to the knock sensor 12. Knock sensor 12 may be a wide band accelerometer exhibiting an essentially flat frequency response across a range of frequencies including the characteristic knock frequencies, a tuned accelerometer having a multiple peak tuning characteristic with said peaks in the vicinity of the characteristic knock frequencies or any other sensor capable of sensing vibrations at both frequencies. The output signal of sensor 12 is provided to a knock detecting circuit 14, which is shown in block form in FIG. 2. The output of circuit 14 may be provided to control 22, which controls an engine operating parameter such as spark timing for a closed loop control on knock.

Figure 2:
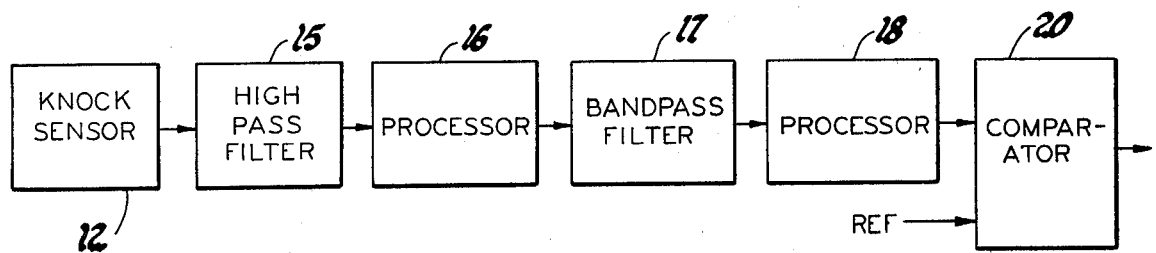
FIG. 2 shows a block diagram of apparatus suitable as the knock detecting apparatus of FIG. 1.

Referring to FIG. 2, the output signal from knock sensor 12 is shown as being filtered by a high pass filter 15 and provided to a processor 16. The purpose of processor 16 is to form the product of the two separate frequency components at the two knock frequencies from the knock sensor 12. This product will include, among other components, two product components, one having a frequency equal to the sum of the characteristic knock frequencies and the other having a frequency equal to the difference of the characteristic knock frequencies. The latter product component is chosen by a band pass filter 17 and may be further processed in a processor 18 before being provided to one input of a comparator 20, the other input of which is provided with a reference REF. When the signal from low pass filter 18 provided to comparator 20 exceeds the reference REF, comparator 20 produces an output signal indicative of knock.

To examine the operation of processor 16 in greater detail, let the signal from knock sensor 12 when knock occurs in engine 10 be defined as $X(t) = A_1 \cos f_1 t + A_2 \cos f_2 t + n(t)$, where the first term is a component at the first characteristic knock frequency $f_1$, the second term is a component at the second characteristic frequency $f_2$ and the third term represents noise. The most practical device for use as processor 16 is a square law device such as a simple diode which produces the square of the input signal as follows:

$$x^2(t) = (A_1 \cos f_1 t)^2 + (A_2 \cos f_2 t)^2 + n^2(t) + 2A_1 A_2 \cos f_1 t \cos f_2 t + 2n(t)(A_1 \cos f_1 t + A_2 \cos f_2 t).$$

This may be alternatively expressed as $A_1^2(1+\cos 2f_1 t)/2 + A_2^2(1+\cos 2f_2 t)/2 + n^2(t) + A_1 A_2 \cos (f_1-f_2)t + A_1 A_2 \cos (f_1+f_2)t + 2n(t)(A_1 \cos f_1 t + A_2 \cos f_2 t)$. It can be seen that this expression involves components at twice the characteristic knock frequencies of $f_1$ and $f_2$. This is a specific example of the general fact that a square law device will produce output components at twice the frequency of any input component. Therefore, because of the possibility that some input component may have a frequency precisely one half the difference of frequencies product component which is indicative of knock, high pass filter 15 is provided to reject any input to processor 16 having a frequency less than or equal to one half the difference frequency $f_1-f_2$. It also means that, if a square law device is used as processor 16, it would be impractical to use the sum of frequencies product component at frequency $f_1-f_2$. The latter is true because high pass filter 15 would be required to reject any input component of frequency less than or equal to one half the sum of frequencies which would necessarily reject one of the two characteristic knock frequencies from knock sensor 12.

Figure 4:
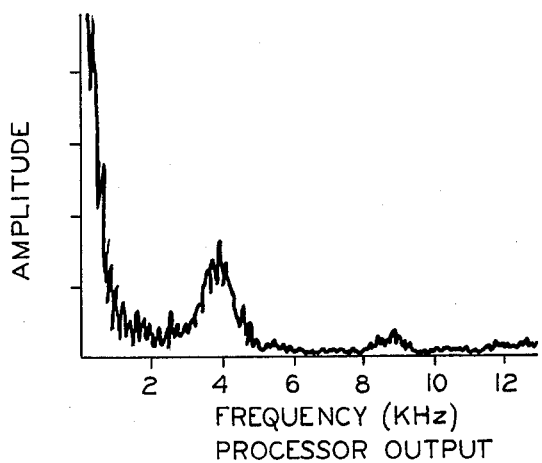
FIG. 4 shows an amplitude versus frequency plot of the product signal derived by a processor in the apparatus of FIG. 2.

Band pass filter 17 is tuned to the difference frequency $f_1-f_2$ in order to select the desired single frequency component indicating the simultaneous presence of both characteristic knock frequency components and therefore indicative of knock. In the previously mentioned example, the difference frequency is 3.8 kilohertz; and a band pass filter centered on this frequency with a band width of 500 hertz should be adequate. The plot of FIG. 3, as previously described, shows the output of knock sensor 12 when knock is present in engine 10 with strong components centering on 7 and 10.8 kilohertz. The plot of FIG. 4 shows the output of processor 16 with a strong component at 3.8 kilohertz. It may be noted that there is no such component at 3.8 kilohertz in the plot of FIG. 3, which means that this frequency is not itself one of the characteristic knock frequencies nor is it a frequency at which strong noise is produced in the engine. Rather, its presence at the output of processor 16 is an indication of the simultaneous presence of the two characteristic knock frequencies at 7 and 10.8 kilohertz in the knock sensor signal, as shown in FIG. 3. Thus the 3.8 kilohertz component will not be present in the output of processor 16 in the absence of knock unless engine 10 were to produce superfluous strong vibrations at both the 7 and 10.8 kilohertz frequencies simultaneously, an event of small likelihood. Therefore the response of the system to false indications of knock is rendered much less likely and the system may be tuned with a greater sensitivity to knock.

If it is discovered that a particular engine does produce strong noise vibrations at two frequencies not both equal to characteristic knock frequencies but having the same difference frequency, the possibility of false knock indication can be reduced by including low pass filtering before processor 16, either transforming high pass filter 15 to a band pass filter with a passband just wide enough to pass the two characteristic knock frequencies or by accomplishing similar filtering by tuning the sensor. However, this situation is thought to be unlikely, so a high pass filter 15 should suffice. Furthermore, although one can conceive of a situation where this method of knock detection will not produce the described advantages because one characteristic knock frequency is precisely one half the other and therefore equal to the difference, the characteristic knock frequencies have been found to occur in certain observable and repeatable patterns which do not include one frequency being twice another. Therefore, this situation does not actually occur.

Processor 18 is not required for the practice of this invention: the signal from band pass filter 17 can be provided directly to comparator 20. However, the knock detection may be improved still further if the signal from band pass filter 17 is detected and the envelope pulse filtered in a filter which distinguishes knock from noise envelope pulses on the basis of duration or shape. A matched filter can be used; or such a matched filter can be approximated by a low pass filter, since knock pulses tend to have longer durations than noise pulses of the same amplitude. The matched or low pass filter has the effect of boosting the amplitude of a knock pulse more than that of a shorter noise pulse to further improve the signal to noise ratio. The filter would be matched to the characteristics of a particular engine; however, it would probably be a multipole low pass filter with a half power frequency in the vicinity of 90 to 250 hertz.

Reference REF is preferably noise dependent. Many methods and systems for producing such a reference are shown in the prior art. One for example is shown in the West et al U.S. Pat. No. 4,111,035, granted Sept. 5, 1978. The output of comparator 20 may be provided to control 22 in order to control spark timing in engine 10 as shown in the above cited West et al patent and the West U.S. Pat. No. 4,106,447, granted Aug. 15, 1978 and Kearney et al U.S. Pat. No. 4,276,861, granted July 7, 1981.

It can be seen that the practice of this invention improves the signal to noise ratio in the knock detection process, since the signal used is a product component of input components at two separate characteristic knock frequencies. If the signal to noise ratios of the input components are $A_1/n_1$ and $A_1/n_2$, respectively, the product signal to noise ratio is $A_1A_2/n_1n_2$, which is greater than either $A_1/n_1$ or $A_2/n_2$ providing the latter are both greater than one. In addition, there will be no product component unless both input components are present simultaneously. Therefore, the apparatus tests for the simultaneous occurrence of two characteristic knock frequencies. In addition, only one processor 18 is required, rather than two as in the case wherein vibrations at the two characteristic knock frequencies are separated with band pass filters and processed in separate channels. If processor 18 includes a matched or multipole low pass filter, cost savings could be significant.

All elements of the apparatus shown in FIGS. 1 and 2 are known, separately, in the prior art. Therefore, no specific circuits have been shown except where described in a cited U.S. patent. Those skilled in the art should be able to practice the invention on a particular engine with no major difficulty. They will also think of obvious equivalents which, although not specifically described herein, are nevertheless within the scope of this invention. Therefore, that scope should be limited only by the claims which follow.

The embodiments of the invention in which an exclusive property or privilege is claimed are defined as follows:

1. A method of detecting knock in an internal combustion engine of the type subject to knock induced vibrations of at least two characteristic knock frequencies and noise vibrations not associated with knock, comprising the steps of:

generating a signal having components at least in accord with the knock induced vibrations of the engine at the two characteristic knock frequencies;

processing said signal to produce a product signal having a product component with a magnitude proportional to the magnitudes of said signal components and a frequency equal to the difference of said characteristic knock frequencies, said step increasing the signal to noise ratio of said signal; and detecting the existence of a predetermined magnitude of said product component to sense the presence of knock.

2. Apparatus for detecting knock in an internal combustion engine of the type subject to knock induced vibrations of at least two characteristic knock frequencies and noise vibrations not associated with knock, the apparatus comprising:

vibration sensor means on said engine responsive at least to said knock induced vibrations at the characteristic knock frequencies and effective to generate an output signal;

first signal processing means responsive to the simultaneous occurrence of significant components at the two characteristic knock frequencies in the output signal of the vibration sensor to generate a product component having an amplitude proportional to the amplitudes of said vibration sensor components and a frequency equal to the difference of said characteristic knock frequencies, said product component having a greater signal to noise ratio than either of said vibration sensor components;

filter means effective to select said product component from all other components at different frequencies which are generated in or passed by the first signal processing means; and second signal processing means effective to compare the amplitude of said product component with a reference and generate a knock signal when said reference is exceeded.

3. Apparatus for detecting knock in an internal combustion engine of the type subject to knock induced vibrations of at least two characteristic knock frequencies and noise vibrations not associated with knock, the apparatus comprising:

vibration sensor means on said engine responsive at least to said knock induced vibrations at the characteristic knock frequencies and effective to generate an output signal;

filter means effective to block components in the vibration sensor output signal having a frequency equal to one half the difference of the characteristic knock frequencies;

first signal processing means effective to receive the filtered vibration sensor output signal and including a square law device effective to generate a product component having an amplitude proportional to the product of the amplitudes of the vibration sensor components and a difference frequency equal to the difference of said characteristic knock frequencies, whereby the signal to noise ratio of the product component exceeds the signal to noise ratio of either of the vibration sensor components band pass filter means tuned to the difference frequency and effective to pass said product component and reject strong signals at other frequencies; and second signal processing means including a comparator effective to generate an output knock signal whenever the amplitude of the product component exceeds a noise derived reference.

4. An internal combustion engine of the type subject to knock induced vibrations of at least two characteristic knock frequencies and noise vibrations not associated with knock and having a control parameter effective to control said knock, said engine comprising, in combination:

vibration sensor means on said engine responsive at least to said knock induced vibrations at the characteristic knock frequencies and effective to generate an output signal;

filter means effective to block components in the vibration sensor output signal having a frequency equal to one half the difference of the characteristic knock frequencies;

first signal processing means effective to receive the filtered vibration sensor output signal and including a square law device effective to generate a product component having an amplitude proportional to the product of the amplitudes of the vibration sensor components and a difference frequency equal to the difference of said characteristic knock frequencies, whereby the signal to noise ratio of the product component exceeds the signal to noise ratio of either of the vibration sensor components;

band pass filter means tuned to the difference frequency and effective to pass said product component and reject strong signals at other frequencies;

second signal processing means including a comparator effective to generate an output knock signal whenever the amplitude of the product component exceeds a noise derived reference; and means effective to control said control parameter in response to the output of said comparator to control knock in said engine in a predetermined manner.

* * * * *